April 19, 1927.
H. S. PARDEE
1,625,497
RADIATOR CAP
Filed May 10, 1926
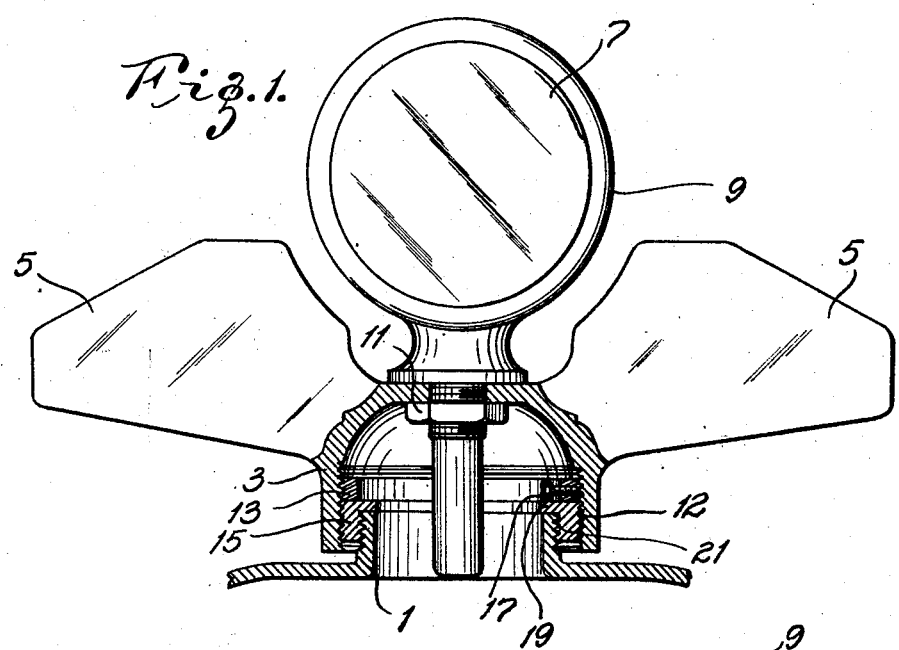
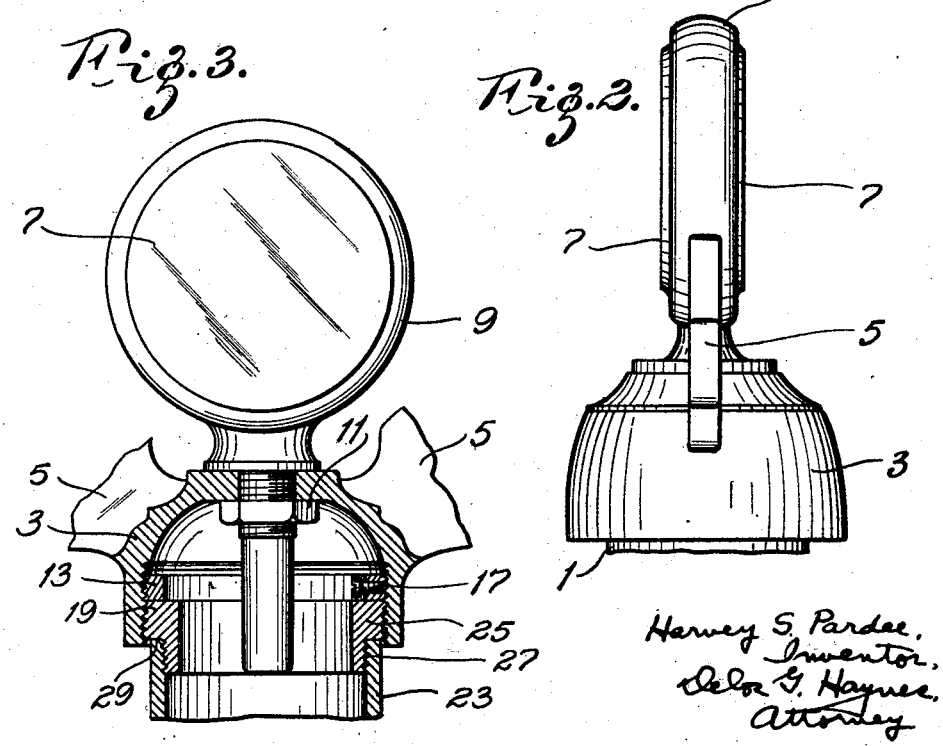
Harvey S. Pardee,
Inventor.
Delos G. Haynes,
Attorney Patented Apr. 19, 1927.

1,625,497

UNITED STATES PATENT OFFICE.

HARVEY S. PARDEE, OF RAVINIA, ILLINOIS, ASSIGNOR TO BELLE EVANS PARDEE, OF RAVINIA, ILLINOIS.

RADIATOR CAP.

Application filed May 10, 1926. Serial No. 107,934.

This invention relates to radiator caps and with regard to certain more specific features, to radiator caps for use on automobile radiator necks or filler tubes.

Among the several objects of the invention may be noted the provision of a preferably ornamental cap adapted to have the ornamental or like shape thereof placed in a predetermined relationship with respect to the radiator on which it is mounted when the cap is screwed to a seat in the conventional manner; the provision of a cap of the type described which is adapted to have said predetermined relationship adjustable at will, in order that the cap may fit properly on any of various radiator necks; and the provision of a cap of this class described which is simple to fabricate, involving only a few parts which are not readily subject to derangement, either by use or abuse.

This invention accordingly comprises the features of construction, combination of elements and arrangements of parts, which are exemplified in the description hereinafter in connection with the accompanying drawings, and the scope of the application of which will be indicated in the following claims.

In the accompanying drawings, in which are illustrated two of various possible embodiments of the invention, Fig. 1 is a cross-section of the improved cap, shown applied to a filler tube, and shows certain parts in elevation;

Fig. 2 is a side elevation; and,

Fig. 3 is a fragmentary view similar to Fig. 1 but shows a modified form of adapter bushing.

Similar reference characters indicate corresponding parts throughout the several views of the drawings.

Referring now more particularly to Fig. 1 there is illustrated at numeral 1 a radiator neck or filler tube of the externally threaded type. Numeral 3 designates the body of a radiator cap which is provided with ornamental side wings 5. The wings 5 are intended to occupy a predetermined position or relationship with regard to the body lines of the vehicle on which the cap is mounted. This is also true of the dial 7 of the temperature indicating instrument 9, which is held to the body 3 by means of a conventional threaded nut 11.

Present day practice and construction require that the plane of the instrument dial 7 be located substantially crosswise of the automobile or vehicle, in order that it may be read. Custom also now requires an equivalent positioning of the wings 5. This statement illustrates the reason for desiring a specific positioning of the body 3 with regard to the neck 1, that is, each time said body is screwed down to a closed position. Any other arbitrary position for the wings and the like, or the instrument 9 might be desired for practical or other reasons.

The present invention per se, comprises the provision of internal threads 12 on the body 3. A threaded stop ring or stop 13 is screwed internally on the said threads and is followed by an externally threaded adapter bushing 15. A set screw 17 serves to retain the ring 13 in any predetermined position on the threads 11. The screw 17 may be manipulated by means of an ordinary screw driver used at a slant, by an offset screw driver, or the screw 17 may itself be canted with respect to the ring 13. The screw threads thus far described may all have a standard diameter and pitch.

The inside upper end of the adapter bushing 15 is provided with a shoulder 19, which is adapted to abut the lower edge of the ring 13 and the upper edge of the neck 1. The bushing 15 is provided with internal threads 21, of dimensions to fit the particular threads of any particular make of filler tube 1. These filler tube threads are not alike on all makes of automobiles and therefore a series of adapters is desirable, having threads of different dimensions to fit the different makes of filler tubes, and making it possible to use a cap and stop ring of standard dimensions, adapted for use on any make of radiator neck having distinctive thread dimensions.

The length of the threaded portion on the filler tube also varies and it is desirable that the body of the radiator cap project downward sufficiently to cover the exposed threads, which are more or less unsightly. Therefore, a vertical adaptation or adjustment is desired, and this is accomplished by screwing the stop ring 13 up or down as the case may require.

The cap may be delivered to the user with the ring 13 and adapter 15 loosely engaged in any position. The device is applied to the radiator neck and screwed down until the adapter 15 seats on top of the radiator neck 1 and also abuts the ring 13. The motion will cease with the cap generally in the wrong position, both axially and in relation to its alignment with the lines of the car. The cap can then be removed and the ring 13 adjusted more nearly to its right position and fastened with the set screw 17. A second trial in this manner will usually suffice to position the cap exactly as desired. When the cap is properly installed in the above manner, water tightness is assured, because solid metallic seats are used instead of resilient gaskets, which wear or deteriorate or lose their resiliency. The cap thereafter may always be removed and replaced, with the assurance that it will be applied in exactly the right manner. If more than two trials are required for initially positioning the ring 13, they may of course be made.

In the present day practice, it has usually been necessary to use resilient gaskets between the seats, because both the threads on the cap and on the filler tube of the radiator neck are made at random in their axial relation to the seats, and to make up for this indeterminate variation, a gasket which can be compressed at least to an amount equal to the pitch of one thread is necessary. But such gaskets often give trouble, losing their resiliency or effective thickness, so that after the cap has been removed and applied a number of times, it no longer screws down tightly in the original correct position and additional gasket material becomes necessary. If a new gasket is not installed, the cap will not properly align itself with the car, or if it is aligned with the car, it is liable to leak. The solid metallic seat provided by this construction is therefore of great advantage.

It is to be understood that a non-resilient gasket, that is, a gasket non-resilient to compression may be used herein if desired. Such a gasket will provide a non-resilient abutment just as the direct abutment forms a non-resilient abutment. The words "abut" and "abutment" as used herein are meant to include the positioning of elements which are pressed or held together with a non-resilient or non-compressible gasket therebetween, as well as without said gasket.

In Fig. 3 is illustrated a form of adapter applicable to an internally threaded filler tube 23. In this modification the internal threads 21 of the adapter 15 have external threads 27 substituted therefor. In the modification the adapter is renumbered as 25 and the shoulder 19 carries an external lower surface 29 instead of the internal lower surface shown in the first form. The operation and application are identical to those hereinbefore described.

It should be understood that after either form of the improved cap has once been applied and adjusted to a particular filler tube or radiator neck, and when the cap is removed for filling purposes, the adapter 15 may remain with the cap or with the tube 1 without change in the improved results herein described.

In case the radiator neck threads have the same dimensions as those in the cap, the cap may be screwed directly on to the neck, thereby dispensing with the adapter and the same advantages are secured.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A radiator cap comprising a body and a stop member threaded therewith, an adapter having similar threads and adapted to thread with the body and abut said member in any one of an infinite number of desired predetermined axial and angular relations it may assume with respect to the body.

2. A radiator cap comprising a body and an adjustable stop ring threaded therewith, an adapter adapted to thread with the body and abut said ring in any one of an infinite number of desired predetermined axial and angular relations it may assume with respect to the body, said relationship being attained by adjusting the ring, and means for holding said ring in any one of every possible position it may take with respect to said body.

3. A radiator cap comprising a body and an adjustable stop ring threaded therewith, an adapter having similar threads and adapted to thread with the body and abut said ring in any one of an infinite number of desired predetermined axial and angular relations it may assume with respect to the body, said relationship being attained by adjusting the ring, means for positively holding the ring in any one of its infinite number of threaded positions on the body, a separate thread on the adapter for joining it to a radiator tube, and a non-resilient abutment between it and said tube.

4. A radiator cap comprising an adapter constructed to screw to a filler tube and to positively attain a predetermined angular and longitudinal relationship therewith, means for screwing a body to said adapter, means for stopping the body in any one of an infinite number of angular and longitudinal relationships with respect to the adapter, and means for adjusting and changing said last-named relationships.

5. A radiator cap comprising an adapter constructed to screw to a filler tube and to positively attain a predetermined angular and longitudinal relationship therewith, means for screwing a body to said adapter, means for stopping the body in any one of an infinite number of angular and longitudinal relations with respect to the adapter, means for adjusting and changing said last-named relations, said means comprising a stop adjustably held to the body and adapted to engage the adapter and means for holding the stop in any one of an infinite number of positions it is adapted to take with respect to said body.

6. A radiator cap comprising a body, a stop threaded thereto, means for positively holding the stop in any one of an infinite number of its threaded positions, an adapter threaded to the body and non-resiliently abutting the stop ring, and means for fastening the adapter to a radiator neck.

7. A radiator cap comprising a body, a stop threaded thereto, means for positively holding the stop in any one of an infinite number of its threaded positions, an adapter threaded to the body and directly abutting the stop ring, means for screwing the adapter to a radiator neck and a positive stop thereon adapted to non-resiliently abut said neck.

In testimony whereof, I have signed my name to this specification this 30th day of April, 1926.

HARVEY S. PARDEE.